May 26, 1931.  F. WILLE  1,806,989
GAS DRIER
Filed Jan. 5, 1929
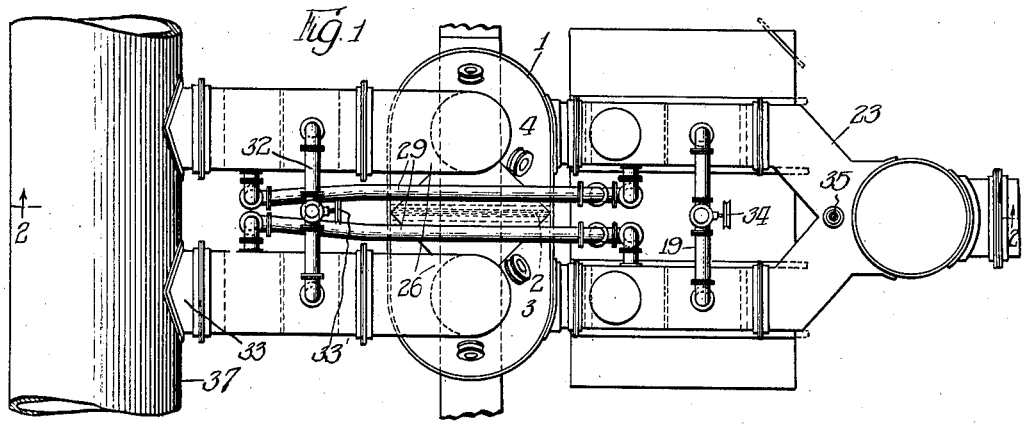
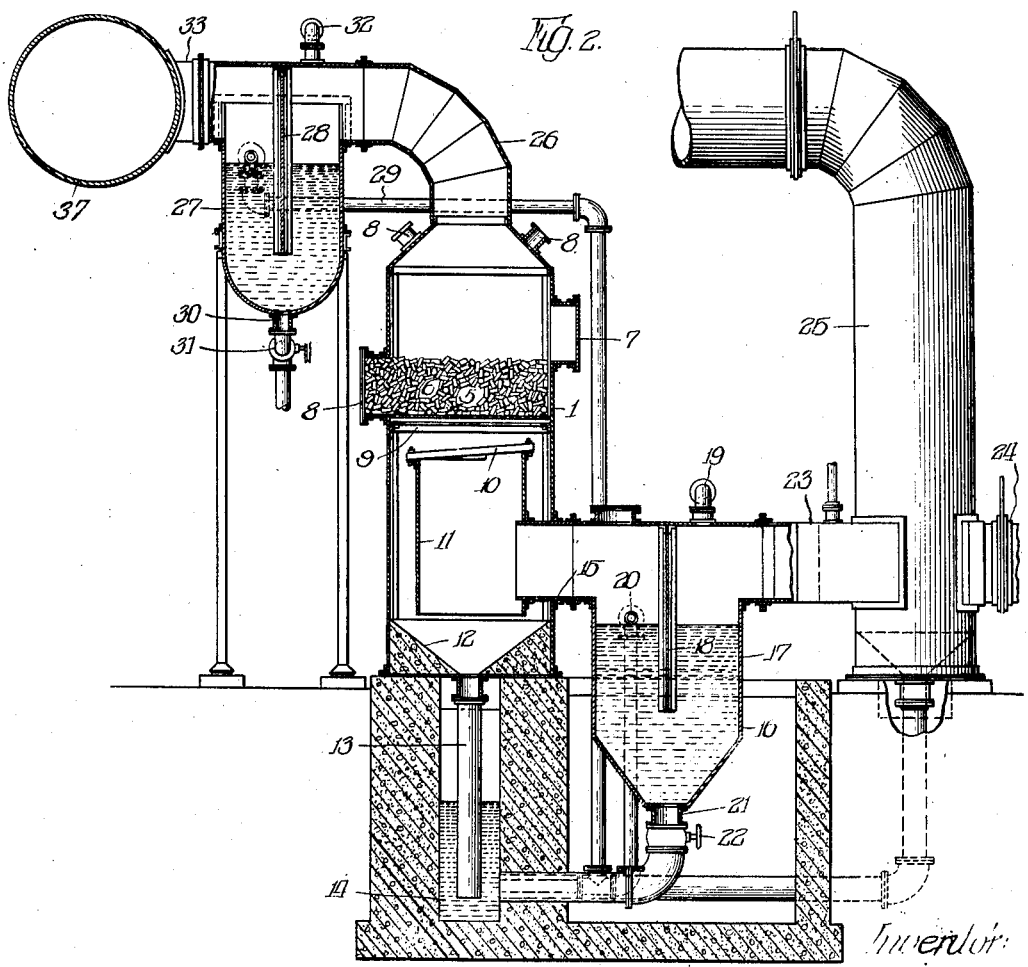
Inventor:
Fred Wille,
By Wilkinson Huxley Byron + Knight
Attys Patented May 26, 1931

1,806,989

UNITED STATES PATENT OFFICE

FRED. WILLE, OF CHICAGO, ILLINOIS, ASSIGNOR TO H. A. BRASSERT & CO., OF CHICAGO, ILLINOIS, A CORPORATION OF ILLINOIS

GAS DRIER

Application filed January 5, 1929. Serial No. 330,574.

This invention relates to a continuous gas drier. The apparatus is particularly designed for drying blast furnace gas after it has been subjected to cleaning and washing in previous apparatus and may be used to remove the finely divided entrained water in the gas after the gas has been passed through other forms of driers.

It has been previously proposed to form a gas drier in such a manner that the gas is passed upward through distributing means and through a deep layer of filter material, the eliminated water passing downward and being discharged transversely by the same means that distributes the gas. However, this previous design involved only a single passage for the gas and it has been found that it would be necessary in the use of a drier to periodically close off the passage of the gas while the loose filter material is being flushed and cleaned or during the time required to remove and replace the loose material.

It is an object of this invention to provide an improved apparatus embodying a casing forming a tower divided in two parts and having water eliminating means in each portion whereby the full flow of the gas may be passed independently through either side while the other side is closed off, whereby it will not be necessary to shut off the flow of the clean dry gas or provide another gas drier to take its place while the drier is being cleaned and flushed.

It is another object of this invention to connect double water seals in the inlet and outlet lines of a drier whereby the passages may be easily closed or opened on each side.

Other objects and advantages of my invention will be apparent as the description proceeds.

In the drawings wherein I have shown one preferred embodiment—

Figure 1 is a top plan view of the complete apparatus.

Figure 2 is a sectional elevation on line 2—2 of Figure 1.

The drier consists mainly of an oblong casing 1 which is generally placed in a vertical position so that the gas is introduced at the lower end and passes upward to discharge. The casing is divided by vertical walls 2 into two independent sides 3 and 4. The structure of the inside of the tower on either side of the dividing wall 2 is the same and reference will be made to Figure 2 in which is shown a screen 5 supported near the upper end of the tower 1 and above which is a deep layer of loose material 6. The loose material 6 forms a filter for removing the finely divided entrained moisture from the gases passing therethrough and provision is made for introducing clean filter material through a manhole 7 and removing the dirty material through manhole 8. At the top of the tower is provided a pair of flushing nozzles 8 through which water may be introduced to periodically clean the filter material.

Just beneath the screen 5 are baffling, distributing and collecting means 9 and 10 of any suitable form, but preferably such as is disclosed in the application of Arthur J. Boynton and Charles Dougan, Serial Number 329,885, filed January 2, 1929 and assigned to the assignee of this application.

The baffling and distributing means 10 are disposed in a slanting plane and thus the water collected in the troughs is discharged transversely and drops near the wall of the casing 1. Baffling means 10 are supported at the upper end of an inlet chamber 11 comprising a vertical cylindrical casing having open upper and lower ends into which the gas is admitted. Some water may be collected on the walls of the inlet chamber 11 and are run down and collected on the bottom of the tower 1 together with the water dropping from the baffling means 10. This water is directed by a conical bottom 12 of the casing into a discharge pipe 13 extending through a sump 14.

There is an inlet pipe 15 extending through the wall of the tower 1 into the inlet chamber 11. The inlet pipe 15 is connected to a water seal 16. As shown, the water seal 16 is a means for closing off the inlet to either side of the tower 1 as a preferred form but it is obvious that other means may be used, such as gate valves.

The water seal 16 consists of a U-shaped bend formed by downwardly extending enlargements 17 into which extends a baffle 18 causing the gas to pass down and under the baffle 18 and up into the inlet pipe 15. Water may be admitted to the water seal 16 through inlet pipe 19 in order to fill the U-shaped bend above the lower end of the baffle 18, thus closing the passage. A pipe 20 receives the overflow and is connected to the sump 14. The U-shaped bend may be drained through a discharge pipe 21 by opening valve 22. The inlet 23 to the U-shaped bend may come direct from the discharge of a previous disintegrator through pipe 24 or through the by-pass from the cooling tower 25. The inlet 23 is formed in a Y so that its discharge is connected to both of the water seals connected to either side 3 and 4 on the tower 1, as shown in Figure 1.

At the upper end of the tower is provided a discharge pipe 26 for the dry gas on either side 3 and 4 of the tower and is connected to a U-shaped water seal 27 similar to the seal 16, previously described, thus there is shown a vertical baffle 28 and an overflow pipe 29 extending to the sump 14.

At the lower end of the U-shaped bend is a drain 30 and a valve 31 for discharging the water in the seal. An inlet pipe 32 disposed at the top admits water to close the seal. The discharge from the U-shaped seal through pipe 33 is connected to a dry gas main 34 to which the discharge from the other side of the tower is similarly connected, as shown in Figure 1. The valve 33, shown in Figure 1, is a three-way cock for admitting water through pipe 32 to either side in order to supply water to the corresponding water seal. The valve 34, shown in Figure 1, is a similar three-way cock for closing the desired water seal. A double gauge 35 may be used to indicate the pressure on the drier while either side of the tower is in use.

Thus, in operation, the full flow of the blast furnace gas from the previous washers and cleaners may be directed through one side of the tower 1 and discharged through the dry gas main 37. Thus the U-shaped seals 16 and 27 on that side of the apparatus are open while the corresponding seals on the other side are closed. The said gas in passing through the loose material will lose its water content and water will be collected and discharged to the sump while the dry gas passes on to the main 37. After a period of use the loose material will become dirty from the dust of the gas and resistance to passage of the gas will be caused. When the gauge 35 indicates a pressure sufficient to show that the resistance of the passage is too great, the water seals 16 and 27 on that side may be closed by opening valves 33 and 34 and the U-shaped seals on the other side are opened so that the full flow of the gas will pass through the other side of the casing and the continuous discharge of the dry gas will not be interrupted. The loose material on the closed side may then be flushed or renewed with new material.

It will be understood that both sides of the drier may normally be used simultaneously, either side being closed off only when required for cleaning or repair.

While I have shown and described one preferred embodiment by way of example, it is to be understood that my invention is capable of change and modification to meet varying conditions and I contemplate such variations and changes as come within the spirit and scope of the appended claims.

I claim:

1. In a continuous gas drier, walls forming a pair of vertical passages, water eliminating means comprising a layer of loose material in each of said vertical passages, inlet and outlet passages for the gas connected to each of said vertical passages, means for flushing the loose material in either vertical passages as desired, and means for closing the inlet passage to the vertical passage which is being flushed while the remaining inlet passage and vertical passage are open to the flow of gas.

2. In a continuous gas drier, a vertical casing divided by a vertical wall, water eliminating means comprising a layer of loose material in each side of the casing, inlet and outlet passages for the gas connected to each side of the casing, means for flushing the loose material in either side of the casing and means for closing the side of the casing which is being flushed while the remaining side is opened to the passage of the gas.

3. In a continuous gas drier, a vertical tower divided by a vertical wall into two corresponding sides, water eliminating means in both sides of the casing comprising a layer of loose material, inlet and discharge manholes for removing and replacing the loose material, means including sets of two U-shaped water seals for closing the tower on the side in which the loose material is being renewed while the other side is opened to the full flow of the gas.

4. In a continuous gas drier, a vertical tower divided by a vertical wall into two separate sides, each side having water eliminating means, inlet means at the lower end of each side of the tower and outlet means at the upper end of each side of the tower, U-shaped water seals connected to the inlet and outlet pipes on each side of the tower, means for opening the water seals on one side of the tower while the water seals on the other side are closed.

5. In a continuous gas drier, a double chamber, each portion of the chamber containing water eliminating means, means including a plurality of U-shaped water seals for passing the full flow of the gas through either portion of the chamber while the other portion is closed to the passage of the gas.

Signed at Chicago, Illinois, this 31st day of December, 1928.

FRED. WILLE.